Aug. 18, 1964
H. B. NEWTON
3,145,037
SPRING FASTENER
Filed March 7, 1963
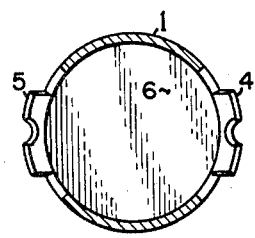
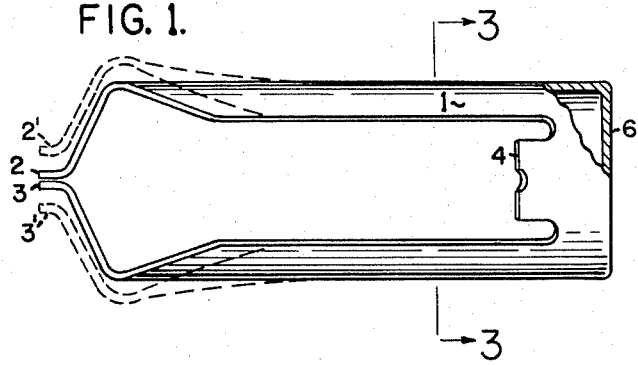
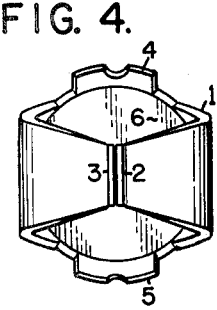
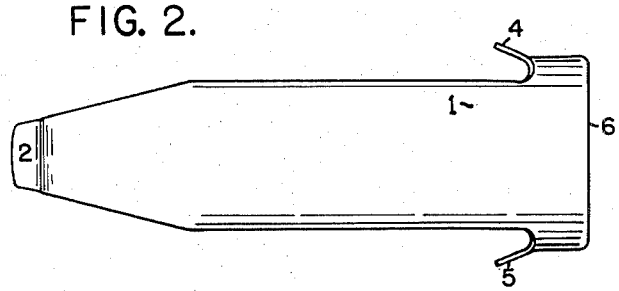
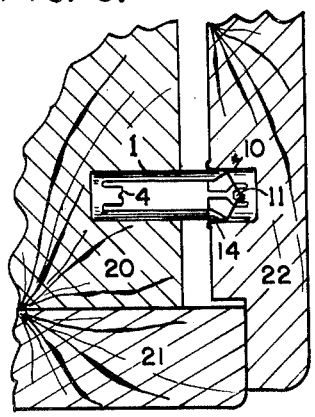
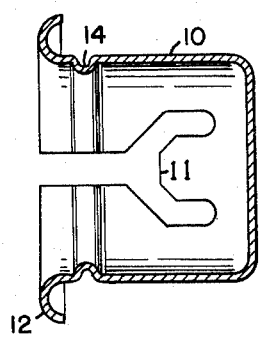
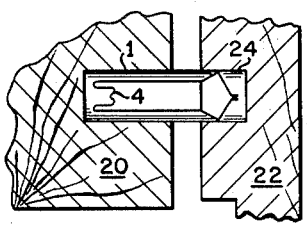
INVENTOR.
HAROLD B. NEWTON
BY *Harry R. Lubcke*
AGENT the following pages

United States Patent Office 3,145,037
Patented Aug. 18, 1964

3,145,037
SPRING FASTENER
Harold B. Newton, Sun Valley, Calif., assignor to James B. Lansing Sound, Inc., Los Angeles, Calif., a corporation of California
Filed Mar. 7, 1963, Ser. No. 263,631
9 Claims. (Cl. 292—17)

My invention relates to a fastener and particularly to such a device formed in two parts and suited to repeated fastening and unfastening.

Where two structural elements are to be joined in a manner allowing repeated separation and rejoining, the fasteners of the prior art have invariably been involved devices. The transverse bolt latch, mating with a socket, having several parts and usually attached to the structural elements by means of several screws, is well known. More recently magnetic latches have been evolved, in which a strong permanent magnet on one structural element is attracted to a mating magnetic piece upon the other element. Both these magnetic latches are heavy, relatively large and relatively expensive. In substantially all latch applications, simplicity, low cost and small size are desirable. In certain applications, such as in airplanes or other vehicles, light weight is also desirable.

My invention takes the form of a bifurcated male part formed of a spring material, such as metal, which part has a larger uncompressed front transverse dimension for a quasi-cylindrical body than a rear transverse dimension. This part is fitted with spring tabs, which are an integral part of the body and are sprung outwardly toward the front of the part. These tabs hold the part within a hole in deformable surrounding material, such as wood or plastic. Thus, forces exerted upon the protruding bifurcated part during fastening and unfastening will not dislodge the male part.

A mating female part has the form of a cup, in which a ridge of reduced diameter is formed in the forward part thereof. The diameter of the cup is such as to accept the bifurcated male part when that part is pressed together to a substantially uniform diameter. This compression is limited by tips on the forward extremity of each of the bifurcated projections. The ridge within the female part causes maximum compression, with a slight decompression occurring after the bifurcated part has moved beyond (i.e., further into) the cup.

The female part also has spring tabs at the rear of the cup, which are also sprung outwardly toward the front thereof. It is seen that this construction will hold the cup within further deformable surrounding material to allow repeated fastening and unfastening of the male and female parts without dislodging this female part.

In installation it is convenient to drill a hole in one of the structural elements, install the male part and then bring the two structural elements together; as in the case of a hinged door to a cabinet. The bifurcated projection then makes an indentation in the second structural element, which accurately marks the required location for the hole into which the cup is to be impressed.

An object of my invention is to provide a fastener suited for repeated fastening and unfastening.

Another object is to provide a fastening of this type that is small, simple, rugged, light-weight and inexpensive.

Another object is to provide a fastening of this type that is concealed when it is closed in its usual application and which is nearly concealed when it is open.

Another object is to provide a fastening of this type which assists in aligning holes for its installation.

Other objects will become apparent upon reading the following detailed specification and upon examining the accompanying drawings, in which are set forth by way of illustration and example certain embodiments of my invention.

FIG. 1 shows a side elevation of the bifurcated male part of the fastener.
FIG. 2 shows a plan view of the same,
FIG. 3 shows a sectional end view of the same taken along lines 3—3 in FIG. 1,
FIG. 4 shows a front end view of the same;
FIG. 5 shows a sectional elevation of the female cup, part of the fastener;
FIG. 6 shows a sectional plan of a typical application of the fastener in the closed position, and
FIG. 7 shows the same as FIG. 6, but employs only the male part of the fastener.

In FIG. 1 the quasi-cylindrical body is represented by numeral 1. The bifurcated forward ends are shown in contact at 2 and 3 and are shown not in contact in the dotted representation at 2' and 3'. The former position is the one taken when the male part is fully compressed, as when it passes within the ridge within the female part. The dotted position is the one taken when the male part is fully disengaged. This position is taken because of the spring nature of the male part, to be later described. The male part also has spring tabs 4 and 5, which will be noted as sprung outwardly forwardly in all of the FIGS. 1 through 4.

This part is typically manufactured from low carbon steel, such as SAE 1010, which has a soft drawing quality and is supplied in flat sheets. The whole outline of the male part, as with the bifurcated ends and the tabs bent backward to a single plane, is stamped out of flat sheet material. It will be understood that my fastener may be made in a great range of sizes to serve for large, small and intermediate sizes of installations. A typical embodiment is one that is one-fourth the size of the showing of the drawings; i.e., approximately ⅜" diameter by 1¼" long. For such a size, sheet stock of the order of 0.017" thickness is suitable.

In manufacture, this part is drawn to provide the fully cylindrical end 6 and the other quasi-cylindrical shape forward thereof, as has been described. Typically, the quasi-cylindrical parts 1 occupy half of the whole circumference in one-quarter increments. When the part has been given its desired unstressed shape it is then carburized by the known process employing a molten salt bath to give a spring temper. The completed part weighs of the order of one-tenth of one ounce.

In FIG. 5, cup 10 has a nearly complete cylindrical shape. There is a Y-shaped cut-out which extends from the front to nearly the back of the cup. This forms the tab 11, in the throat of the Y, of which the forward part is bent outward, as were tabs 4 and 5 of male part 1. In FIG. 5 the sectional view shows only one tab, but it is easily understood that a second one is positioned diametrically opposite to the tab 11 that is shown. A rolled front edge 12 is formed in order to insure entry of the male part of the fastener where an installation is slightly defective because of misalignment of the surrounding holes in the structural elements and also to give the work a finished appearance after the cup is inserted into the structural element. The internal ridge that has been described is shown at 14 in FIG. 5. This is employed to retain the male part within the female part during the normal closed relation of the fastener pair.

Typically, the internal diameter of the cup may be a few thousandths of an inch larger than the stressed diameter of the male part, in which stressed condition it is fully cylindrical all along its axis. The internal diameter of ridge 14 should be several thousandths of an inch less than the cylindrical diameter of the male part in order that the deformation of the male part will be considerable and thus the holding power of the two parts of the fastener will be considerable. It will be understood that the holding power may be altered to suit any particular application by manufacturing all of the fasteners for that application with a ridge of corresponding depth.

Cup 10 is also formed from flat C1010 stock, which may be 0.015" thick, is drawn into the cup form by suitable dies in a punch press and is carburized to spring temper as was the male part.

One application of my fastener is shown in plan in FIG. 6. In the sectional plan view of a cabinet, say of wood, a shelf or bottom or top surface 20 of the cabinet is shown. A side member 21 is joined to the shelf or other member in ways known to the art of the cabinet-maker. A door 22 is arranged to hinge from a point relatively far away from the part of the cabinet shown so that the arc upon which the door closes is approximately a straight line when a section of the arc of an order of a half-inch is considered. My fastener may be used in any application in which two structural elements, here represented by elements 20 and 22, have a motion of substantially translation, one to the other.

Within a hole in element 20 the male part of the fastener, 1, will be recognized in its stressed, or minimum diameter, condition. Within an aligned hole in element 22 the female cup 10 will also be recognized. The bifurcated ends of part 1 are together and the front ends thereof are beyond ridge 14 of the cup. When door 22 is opened, by external manual pressure, the bifurcated ends of part 1 spring apart, as has been stated.

The tabs 4 and 11 have entered and at least slightly deformed the material of elements 20 and 22. This mode of seating the two parts of the fastener has been found to be fully effective in practice.

In addition to the cabinet application described above and other applications like that, the male part alone finds use as a metal dowel in certain structural applications where disengagement of the structural elements is infrequent. In such cases, part 1 is fastened in a hole in one structural element as has been described, but merely a hole 24 having the same diameter as the hole just mentioned is drilled in the second structural element. This provides a secure fit.

One such application occurs in fastening the ornamental front to a loudspeaker cabinet. The ornamental front is provided with, say, four male parts 1, with the spring tabs 4 and 5 engaged to hold the parts in the front. These parts mate with four holes in the cabinet proper. This construction provides a normally tight joint between the front and the cabinet, but one which may be easily broken and subsequently remade when it is necessary to obtain access to the fronts of the loudspeakers.

It will be noted that the spring tabs employed herein are oriented to hold the male or female fitment within the deformable structural element and not to act as a serrated stop for permanently fastening two pieces of sheet material together. While the term fastener may be employed for either, it is clear that I have disclosed a latch fastener, whereas the serrated stop fastener is of the nature of a rivet with the stepped set of teeth taking the place of peening-over at one end of the rivet.

It is further evident that fastening hardware of any description is not required for installing my fitments. The tabs thereof deform the surrounding material of the structural elements and the installation is satisfactory even though the surrounding material be only slightly deformable, as plastic.

The shape, proportions and general nature of the details shown in the figures for my spring fastener first and second fitments have been satisfactory in use and as to ease in manufacturing the parts. It will be understood, of course, that departures in these aspects may be taken in other embodiments without departing from the inventive concept.

Having thus fully described my invention and the manner in which it is to be practiced, I claim:

1. A fastener comprising
   a first fitment having a quasi-cylindrical mody with a forward part divergently sprung from said body, and
   a rearward part partly divergent from said body toward said forward part;
   a second fitment in the shape of a cup having a rearward part partly divergent from said cup toward the forward part thereof, and
   an internal ridge in said cup near said forward part;
   said fitments proportioned to allow the forward part of said first fitment to enter into and pass beyond the ridge of said cup for removably fastening said two fitments together;
   said partly divergent rearward parts of both said fitments formed to retain each said fitment within a separate structural element for joining said structural elements by said first fitment entering into said second fitment.

2. The fastener of claim 1 in which the forward part of said first fitment is comprised of
   two members having diametrically opposed arcuate surfaces each having a circumferential extent of approximately one-fourth of the whole circumference of a cylinder.

3. The fastener of claim 2 in which the rearward part of said first fitment is comprised of
   a second member having two diametrically opposed arcuate surfaces short with respect to the length of the opposed arcuate surfaces of said forward part and disposed symmetrically between them.

4. The fastener of claim 1 in which said second fitment has a rolled-outward forward edge
   whereby said first fitment is guided into said second fitment upon the two said fitments being brought together for the engagement of said fastener.

5. The fastener of claim 1 in which said rearward partly divergent part of said second fitment is formed by Y slots on diametrically opposed sides thereof,
   each said slot extending as a single slot to the forward end of said second fitment with said rearward partly divergent part formed of the throat of said Y.

6. A fastener for repeated fastening and unfastening comprising a bifurcated male part of spring material
   having a quasi-cylindrical body with a larger uncompressed front transverse dimension than rear transverse dimension
   and having spring tabs at the rear sprung out toward the front to retain said male part within a hole in deformable surrounding material;
   and a female part in the form of a cylindrical cup,
   said cup having a ridge of reduced diameter near the front thereof proportioned to releasably secure said male part therewithin,
   said female part also having spring tabs at the rear thereof sprung out toward the front to retain said female part within another hole in other deformable surrounding material;
   said hole and said other hole aligned to present said male and said female parts along a substantially common axis for effecting fastening and unfastening thereof upon the application of an external force.

7. A fastener constituted for infrequent fastening comprising
   a male fitment having a quasi-cylindrical body with
   a bifurcated divergent sprung forward part and
   a rearward part having two tabs divergent from said body toward said forward part,
   a first structural element, having
   a hole in said first structural element,
   said male fitment retained in said hole by engagement of said tabs into the material of said first structural element, and
   a second structural element having
   a hole aligned with the hole in said first structural element
   whereby the two said structural elements may be joined and separated by the entry and exit of said male fitment into the hole of said second structural element.
8. The fastener of claim 7 in which said male fitment is formed of carburized spring steel.
9. The fastener of claim 7 in which the tabs of said male fitment each have an indentation at the forward edge thereof to form two teeth in each tab.

References Cited in the file of this patent

UNITED STATES PATENTS

| | | |
|---|---|---|
| 842,304 | Deming | Jan. 29, 1907 |
| 1,056,452 | Remhilt | Mar. 18, 1913 |
| 1,860,186 | Kestenman | May 24, 1932 |
| 2,623,086 | Sampson | Dec. 23, 1952 |